(12) United States Patent  (10) Patent No.: US 8,125,625 B2
Clark et al.  (45) Date of Patent: Feb. 28, 2012

(54) HARD COPY RE-EMISSION COLOR MEASUREMENT SYSTEM

(75) Inventors: Stephan Clark, Albany, OR (US); Brett E Dahlgren, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 273 days.

(21) Appl. No.: 12/501,449

(22) Filed: Jul. 12, 2009

(65) Prior Publication Data

US 2011/0007302 A1   Jan. 13, 2011

(51) Int. Cl.
*G01N 21/00* (2006.01)
(52) U.S. Cl. .......................................... 356/72
(58) Field of Classification Search ................. 347/19; 162/198
See application file for complete search history.

(56) References Cited

U.S. PATENT DOCUMENTS

| | | | |
|---|---|---|---|
| 4,699,510 A * | 10/1987 | Alguard | 356/73 |
| 5,636,015 A * | 6/1997 | Imura et al. | 356/72 |
| 5,642,192 A * | 6/1997 | Gordon et al. | 356/328 |
| 6,272,440 B1 * | 8/2001 | Shakespeare et al. | 702/85 |
| 6,278,521 B1 | 8/2001 | Jablonski et al. | |
| 6,948,793 B2 * | 9/2005 | Bronswijk et al. | 347/19 |
| 6,998,623 B2 | 2/2006 | Usami et al. | |
| 7,031,084 B2 | 4/2006 | Vizard et al. | |
| 7,053,397 B1 | 5/2006 | Nishioka | |
| 7,167,247 B2 | 1/2007 | Uemura et al. | |
| 7,251,036 B2 * | 7/2007 | Hendrix et al. | 356/445 |
| 7,471,385 B2 * | 12/2008 | Mestha et al. | 356/243.5 |
| 7,502,099 B2 | 3/2009 | Imura | |
| 7,773,222 B2 * | 8/2010 | Mestha | 356/407 |
| 2003/0058441 A1 | 3/2003 | Shakespeare et al. | |
| 2006/0192957 A1 | 8/2006 | Frick et al. | |
| 2007/0086009 A1 * | 4/2007 | Ehbets et al. | 356/402 |

OTHER PUBLICATIONS i1 iSis Optical Brightener Compensation (OBC) Module user guide, X-Rite Inc., Grand Rapids, Michigan, USA, copyright 2007.

* cited by examiner

*Primary Examiner* — Kara E Geisel

(57) ABSTRACT

Hard copy re-emission color measurement system, comprising a light arrangement for emitting light onto a hard copy, a light detector arranged to detect light re-emitted by the hard copy, and a control circuit configured to process the detected re-emitted light. The light arrangement is arranged to separately and simultaneously emit a first light having wavelengths longer than an ultraviolet wavelength and a second light having wavelengths in the ultraviolet range. The light arrangement is provided with a light guide arranged to guide the first and second light on an at least partly overlapping region on a hard copy.

17 Claims, 6 Drawing Sheets

HARD COPY RE-EMISSION COLOR MEASUREMENT SYSTEM

BACKGROUND OF THE INVENTION

Presently, optical brighteners are added to make paper appear whiter, instead of a yellowish white. Optical brighteners are provided with fluorescent particles that emit light in the visible wavelength band when excited by ultraviolet light, so that when ultraviolet light interacts with paper that has optical brighteners in it, the optical brighteners will absorb the ultraviolet light and re-emit light at longer wavelengths in the visible wavelength band. The power available in the ultraviolet light, i.e. its intensity, and its wavelength will determine the amount of excitation of the fluorescent particles, and hence the light re-emission in the visible wavelength range by the optical brighteners.

In this description, the term re-emission may be understood as comprising reflectance, fluorescence and phosphorescence. A skilled person will understand that it is actually the combination of re-emitted light sorts, e.g. reflectance, fluorescence and phosphorescence, that contributes to the perceived color of a hard copy.

Colors of certain samples can be verified by color measurement systems. Typically, these systems have one or more light sources for emitting light onto the sample. In one example two different light sources are used, wherein the difference in fluorescent re-emission between them is measured.

In another exemplary measurement instrument a single ultraviolet cut-off filter is used. The filter typically has little or no ultraviolet transmission and is inserted between the light source and the sample of the color measurement instrument. The degree of fluorescence of the sample can be assessed by measuring the re-emission of the sample with and without the filter. In a further example two filters are used that divide the ultra violet band into two ultraviolet bands so that the fluorescence can be measured with more accuracy.

In methods that specifically relate to printing hard copies, the printed hard copy is viewed under one illumination condition, for example an illumination condition that does not include ultraviolet light. If the sample were viewed under a different illumination condition, one that has an ultraviolet component, then the sample could appear different in comparison to the first illumination condition.

It is therefore advantageous to be able to assess the colors and/or re-emission properties of a printed hard copy under different illumination conditions.

BRIEF DESCRIPTION OF THE DRAWINGS

For the purpose of illustration, certain embodiments of the present invention will now be described with reference to the accompanying diagrammatic drawings, in which.

DETAILED DESCRIPTION

Figure 1:
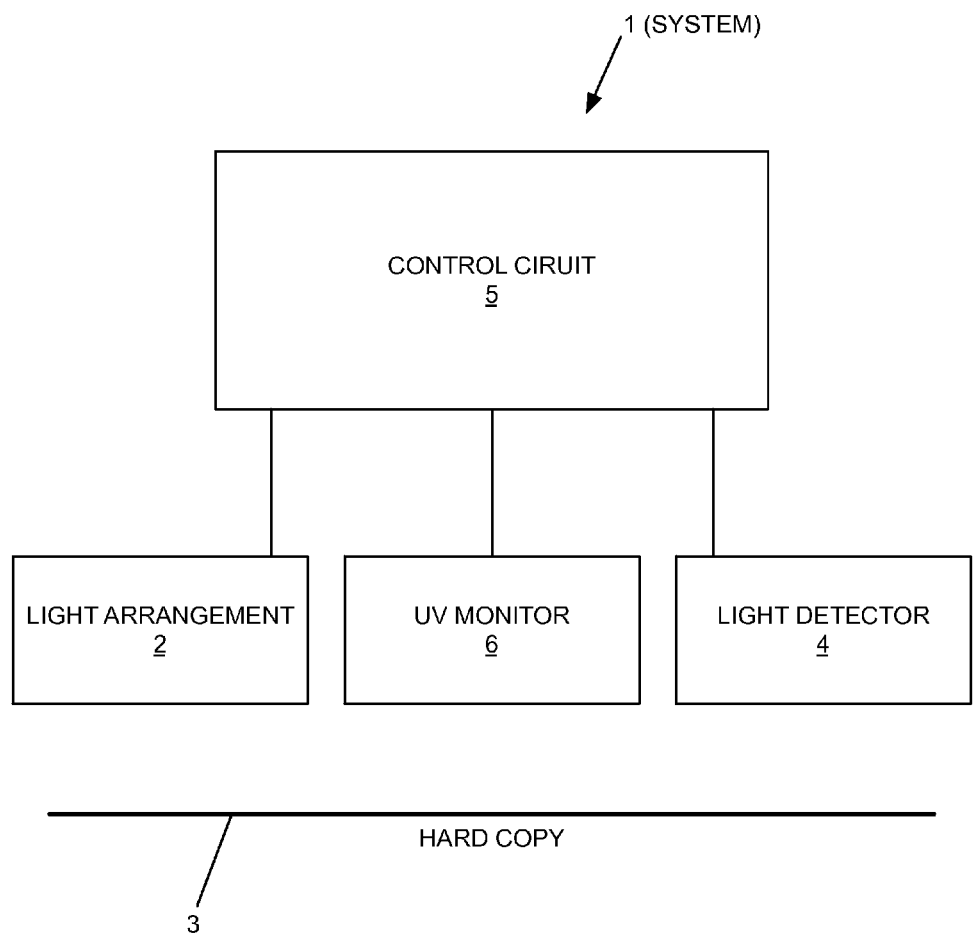
FIG. 1 shows a diagram of a color measurement system.

In the following detailed description, reference is made to the accompanying drawings. The embodiments in the description and drawings should be considered illustrative and are not to be considered as limiting to the specific embodiment or element described. Multiple embodiments may be derived from the following description through modification, combination or variation of certain elements. Furthermore, it may be understood that also embodiments or elements that may not be specifically disclosed in this description may be derived from the description and drawings, and/or may fall within the scope of the invention.

In this description, the term re-emission may be understood as comprising reflectance, fluorescence and/or phosphorescence or any combination thereof. A hard copy printer may be understood as comprising any analogue or digital printing system for printing images, patterns, dots, pictures, etc. onto hard copies. The hard copy printer may be part of, or connected to, a computer, scanner, copying device, network or any processing system or network. A hard copy may comprise a printable substrate such as paper, card board, film, foil, textile, fabric, metal, wood, canvas or any other type of printable substrate. The hard copy may comprise fluorescent material. The substance for printing may comprise a pigment or dye such as ink, paint, latex, wax, or any other suitable colorizing substance.

In this description, a light may be understood as a certain wavelength range of light, while a light source may be understood as an illumination source.

In this description, an illumination condition may be understood as certain light conditions, i.e. at least wavelengths and/or intensities, to which the hard copy is exposed during its intended use. The illumination condition may depend on the location where the hard copy is to be situated, for example on the environmental light that illuminates the hard copy once the hard copy is put into a position for intended use. In certain illustrative examples, the hard copy may for example be expected to be located inside a building where it is illuminated by artificial light, or the hard copy may be positioned outside, illuminated by natural light. In further illustrative examples, the hard copy may for example be exposed to ultraviolet sunlight, or may be positioned behind glass inhibiting ultraviolet exposure. As explained in the introductory part of this description, a difference in illumination condition may change the re-emission properties of a hard copy. Hence, it may be advantageous to be able to predict or estimate a re-emission property of a hard copy that corresponds to a certain chosen illumination condition.

Furthermore, in this description, ultraviolet light, an ultraviolet wavelength, an ultraviolet wavelength range, and such may be understood as light in the wavelength range of typically less than or equal to approximately 400 nanometers. The skilled person will understand that the minimal and maximal limits of the ultraviolet wavelength range may vary, depending on conventions, context, standards, or other circumstances. In this description, a first light may be understood as comprising light having wavelengths longer than ultraviolet wavelengths, and the second light may be understood as comprising light in the ultraviolet range.

FIG. 1 shows a hard copy re-emission color measurement system 1. The system 1 comprises a light arrangement 2 for emitting light onto a hard copy 3. A light detector 4 may be provided for detecting light that is re-emitted by the hard copy 3. In use, the hard copy 3 may be positioned so as to re-emit light emitted by the light arrangement 2 in the direction of a light detector 4. The hard copy 3 may be a printed hard copy 3 having a print of an image on the surface of the hard copy 3 that faces the light arrangement 2 and the light detector 4. The hard copy 3 may comprise fluorescent particles for re-emitting the light at longer wavelengths than the emission wavelengths. The emission wavelength that excites the fluorescent particles may comprise ultraviolet light.

The light detector 4 may be arranged so as to detect re-emitted light, and convert the detected light into signals. These signals may correspond to the intensity and/or wavelengths of the light. The light detector 4 may comprise a color detector such as one or more of a spectrometer, a monochromator and a color detector, a dual monochromator and a color detector, a monitor diode, a color filter array or the like, and/or any suitable combination thereof.

A control circuit 5 may be provided to process above mentioned signals, which signals may be processed for calculation and/or mapping of certain re-emission conditions of the printed hard copy 3 under different illumination conditions. The control circuit 5 may be part of the hard copy color measurement system 1 and/or part of a system encompassing said color measurement system 1 such as, but not limited to, a hard copy printer, a computer and a computer network coupled to a hard copy printer. Furthermore, the color measurement system 1 may be provided with or connected to a storage device, for example a solid state storage device or the like, for storing tables, measured values, predetermined reference and threshold values, and more.

Furthermore, a light monitor 6 may be provided to monitor light emitted by the light arrangement 2. The light monitor 6 may be monitor diode. The light monitor 6 may be arranged to detect ultraviolet light and convert the detected light into a signal corresponding to the intensity of the detected ultraviolet light.

The light arrangement 2 may be arranged to emit light at a wavelength longer than ultraviolet wavelengths. Furthermore, the light arrangement 2 may be arranged to emit light in the ultraviolet range. The light arrangement may be arranged to separately and simultaneously emit a first and a second light. The first light may comprise wavelengths longer than the ultraviolet range, whereas the second light may comprise wavelengths in the ultraviolet range. In an embodiment, the first and second light may have overlapping wavelengths. In another embodiment, the wavelengths of the first and second do not overlap, or only relatively little, such as less than 5 nanometers, or less than 1 nanometer. In again another embodiment, the first wavelength comprises light in the ultraviolet range and/or the second light comprises light with longer wavelengths than an ultraviolet wavelength.

When the first light is emitted onto the hard copy, there may be substantially no or relatively little fluorescent re-emission by a hard copy 3 containing fluorescent particles. When the second light is emitted onto the hard copy there may be substantially more fluorescent re-emission by the hard copy than when the hard copy is illuminated without an ultraviolet component.

The light arrangement 2 may be arranged to simultaneously emit the first and second light. The light arrangement 2 may be arranged to separately and simultaneously emit the first and the second light. In other words, the light arrangement 2 may be arranged so that either the first light may be emitted, or the second light may be emitted, or both the first and second light may be emitted, or none of both lights may be emitted. Hence, the light arrangement 2 may comprise a switchable component so as to be able to separately switch the first and/or second light.

In an embodiment, the light arrangement 2 may comprise two light sources 7, 8 (see FIG. 2), wherein a first light may emit the first light, and a second light source may emit the second light. The switchable component may comprise an electrical circuit for switching the first light source 7 and/or second light source 8.

In another embodiment, the switchable component may comprise at least one filter that is arranged to cut off ultraviolet light, and/or at least one filter that is arranged to cut off light of wavelengths longer than an ultraviolet wavelength. This at least one filter may be shifted with respect to the at least one light source. The light source may have a relatively broad spectrum so that a limited wavelength range may be allowed through said at least one filter. One or more filters may be arranged to extend between a positioned hard copy and at least one light source. The light arrangement 2 may be arranged so as to emit the first and second light an overlapping region of the hard copy 3. The light detector 4 may be arranged to detect the light that is re-emitted from the overlapping region onto the detector 4. The light monitor 6 may be arranged to monitor the first light and/or the second light emitted by the light arrangement 2. The light monitor 6 may be arranged to transmit signals relating to the intensity of light emitted by the light arrangement 2, and/or changes in intensities, i.e. power fluctuations, of the light to the control circuit 5. The light monitor 6 may be arranged to monitor the second light. The light monitor 6 may be arranged to monitor the intensity of ultraviolet light. The light monitor 6 may comprise a monitor diode, or another suitable light monitor. The light monitor 6 may be arranged to send a signal to the control circuit 5 corresponding to ultraviolet light intensity fluctuations of the second light. The control circuit 5 may be arranged to compare said signal to a reference value, and correspondingly perform calibration. The calibration may comprise adjusting the second light so as to better correspond to a reference value. Alternatively, the calibration may comprise correcting a value in the system 1 that is related to the emission light intensity, and/or the calibration may comprise correcting an algorithm and/or reference value.

Figure 2:
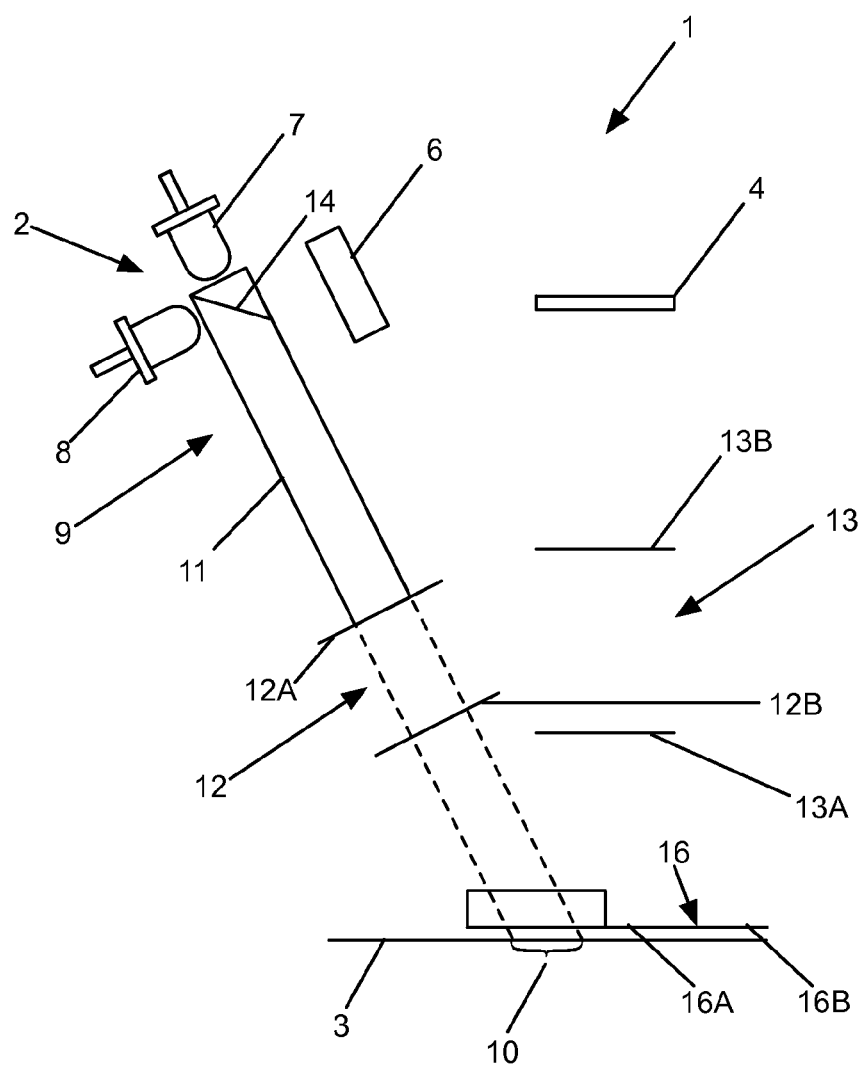
FIG. 2 shows a schematic representation of a color measurement system.

FIG. 2 illustrates an embodiment of a hard copy re-emission color measurement system 1 that is provided with a light arrangement 2. The light arrangement 2 may comprise a first light source 7 for emitting a first light that comprises light of wavelengths longer than an ultraviolet wavelength. The system 1 may further comprise a second light source 8 that emits light in the ultraviolet range. Each light source 7, 8 may comprise a LED (Light Emitting Diode), although other light sources may also be suitable. The light arrangement 2 may further comprise at least one light guide 9. The light guide 9 may be arranged to guide the first and second light onto an overlapping region 10, which may be an overlapping region 10 on the hard copy 3. As a result, the first light having a wavelength longer than an ultraviolet wavelength and a second light having a wavelength in the ultraviolet range may illuminate the hard copy 3 on a same location, simultaneously or separately.

The light guide 9 may comprise a guiding element 11 such as tube, glass fiber, and/or lens arrangement or the like. The guiding element 11 may comprise a tubular shape for guiding the first and/or second light. The light guide 9 may further comprise emission illumination optics 12, comprising one or more lenses 12A, 12B. The emission illumination optics 12 may be arranged to guide the emitted first and second light from the light guide 9 onto the overlapping region 10 of the hard copy 3.

Furthermore, the color measurement system 1 may be provided with re-emission detection optics 13, which may comprise one or more lenses 13A, 13B. The re-emission detection optics 13 may be arranged to guide the light re-emitted by the hard copy 3 to the light detector 4.

The light guide 9 may further comprise a reflective filter 14 that is provided in the light path of the first and second light source 7, 8. The reflective filter 14 may be arranged to at least partly reflect ultraviolet light. The reflective filter 14 may further be arranged to at least partly transmit light of a wavelength longer than an ultraviolet wavelength. The reflective filter 14 may comprise a dichroic coating. The reflective filter 14 may be arranged for the purpose of guiding the transmitted and reflected lights along a common path. In another embodiment, the reflective filter 14 may be arranged to partly transmit ultraviolet light and reflect light of wavelengths longer than an ultraviolet wavelength for approximately the same purpose.

The light that is transmitted by the reflective filter 14 may comprise above mentioned first light, which may comprise longer wavelengths than the ultraviolet wavelengths. The light that is reflected by the reflective filter 14 may comprise above mentioned second light, which may comprise ultraviolet light.

As mentioned, the reflective filter 14 may be arranged so that the transmitted and the reflected light are guided along a common path, or at least onto an overlapping region of the hard copy 3. The reflective filter 14 may direct the reflected and the transmitted light along an overlapping path within the light guide 9. Reflected ultraviolet light and transmitted light having wavelengths longer than an ultraviolet wavelength may be guided through the commonly shared light guide 9 separately and/or simultaneously.

The reflective filter 14 may be arranged to transmit a portion of the ultraviolet light, wherein the transmitted ultraviolet light may reach the light monitor 6. The light guide 9 may be arranged to transmit at least a portion of the ultraviolet light, wherein the transmitted ultraviolet light may reach the light monitor 6.

The light monitor 6 may be provided to detect ultraviolet light from the second light source 8. The light monitor 6 may be arranged to send signals to the control circuit 5 that relate to the detected ultraviolet light intensity and/or the ultraviolet light intensity fluctuations of the second light source 8. The light monitor 6 may be arranged opposite the second light source 8. The monitor 6 may be arranged to detect at least a portion of the ultraviolet light that is transmitted through the reflective filter 14 and/or the light guide 9. The monitor 6 may be arranged, with respect to the second light source 8, on the opposite side of the light guide 9 to detect ultraviolet light that is transmitted approximately laterally through the light guide 9. The monitor 6 may be arranged, with respect to the second light source 8, on the opposite side of the reflective filter 14 to detect ultraviolet light that is transmitted through the reflective filter 14.

The system 1 may comprise a reference surface 16 for verifying light emission properties. The reference surface 16 may be arranged to re-emit incident light in the direction of the light detector 4. The reference surface 16 may comprise fluorescent material. The reference surface 16 may be arranged to re-emit incident ultraviolet light at a longer wavelength. The reference surface may comprise at least two sections 16A, 16B, of which at least one section 16A may comprise fluorescent particles. Another section 16B may be arranged to inhibit re-emission by fluorescence. The reference surface may comprise different sections that may comprise different levels of fluorescence. The sections 16A, 16B may comprise tiles or the like.

The reference surface 16 may be arranged to extend along a hard copy for color measuring. The light guide 9 and the reference surface 16 may be arranged with respect to each other so as to guide the first and/or second light onto the reference surface 16. The light guide 9 may be arranged to guide the first and/or second light onto the hard copy 3 and onto the reference surface 16. The reference surface 16 may be arranged to at least partially move into the light path of the second light so as to re-emit the first and/or second light, and/or to move out of the light path.

The light detector 4 may be arranged to detect light that is re-emitted by the hard copy and/or by the reference surface 16. The light detector 4 may be arranged to send reference signals to the control circuit 5 relating to changes in light that is re-emitted by the reference surface 16. These reference signals may correspond to the intensities and/or wavelengths of the detected light, and/or changes in intensities and/or wavelengths of the detected light. The light detector 4 may be arranged to detect fluctuations in light re-emitted by the reference surface 16.

Figure 3:
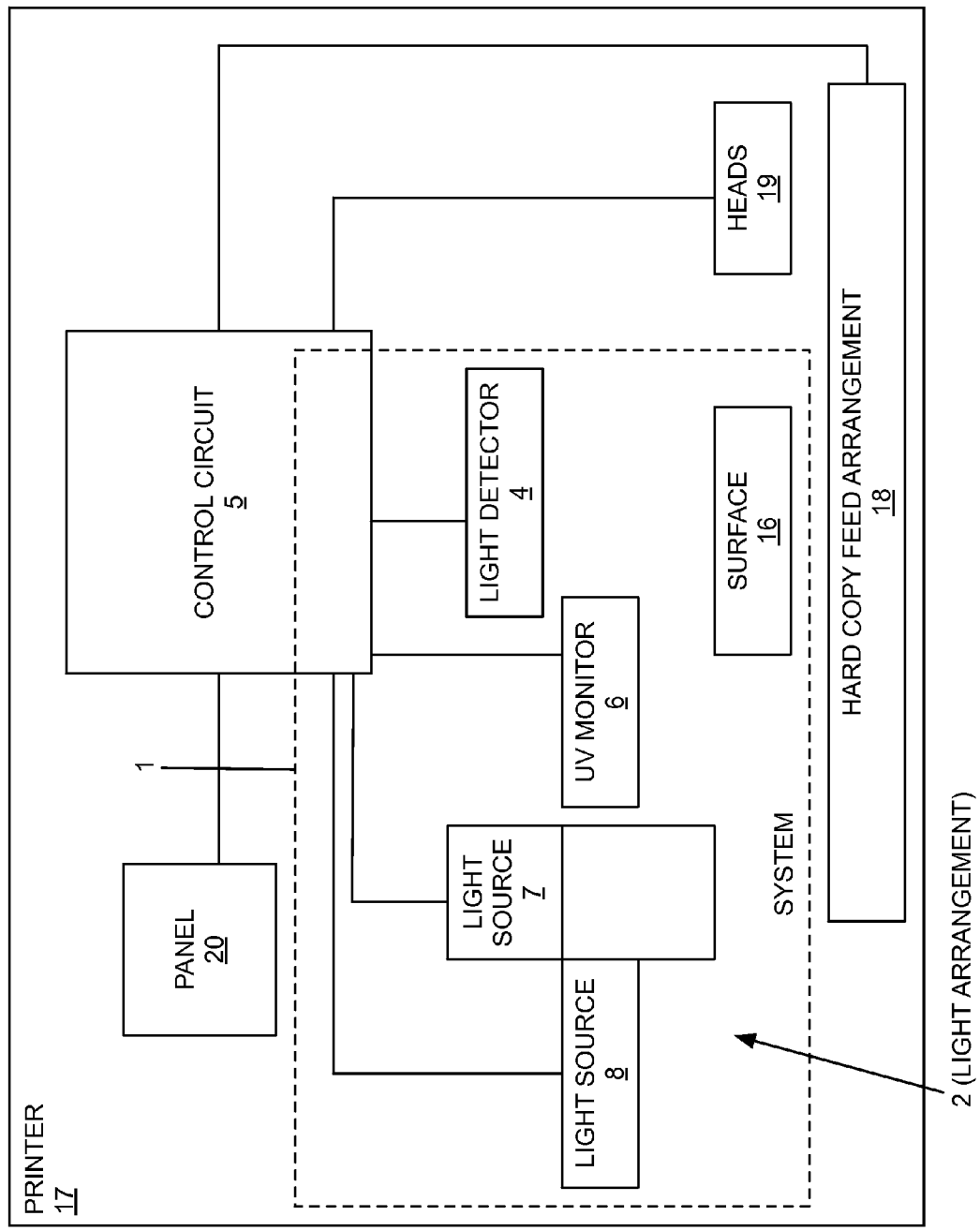
FIG. 3 shows a diagram of a printer including a color measurement system.

In FIG. 3 a hard copy printer 17 is schematically shown, wherein the hard copy re-emission color measurement system 1 may be embedded. The color measurement system 1 is schematically indicated by a dashed line. The hard copy printer 17 may comprise or be part of any type of digital print system such as for example inkjet printers and/or laser printers, and/or analogue printers, and/or copy or scan device. With reference to FIG. 3, the color measurement system 1 may comprise approximately the same system 1 as described above with reference to FIG. 1 or FIG. 2. For example, the color measurement system 1 may comprise one or more light sources 7, 8. The color measurement system 1 may comprise a light guide 9, a light monitor 6, a reference surface 16, and/or a light detector 4. The control circuit 5 may be configured to control the color measurement system 1 and the printer 17.

The printer 17 may be provided with a hard copy feed arrangement 18. The hard copy feed arrangement 18 may be arranged to transport hard copies 3 through the printer 17, and along print heads 19. The hard copy feed arrangement may comprise mechanical drive elements and hard copy guide elements. The hard copy feed arrangement 18 may be arranged to feed respective hard copies 3 along print heads 19 for applying a print to the hard copies 3. The print head 19 may comprise any type of print head, for example an inkjet print head and/or a laser print head. The hard copy feed arrangement 18 may be arranged to position the hard copy 3 with respect to the color measurement system 1. The hard copy feed arrangement 18 may be arranged to position the respective hard copy 3 with respect to the light arrangement 2 and with respect to the light detector 4. In such position the system 1 may emit light onto the hard copy 3 and measure the re-emission wavelengths. The hard copy feed arrangement 18 may be arranged to drive a hard copy 3 along the print heads 19 so that the hard copy 3 is color printed, and subsequently position the hard copy 3 with respect to the color measurement system 1.

The color measurement system 1 may be arranged to perform color measurements after a predetermined amount of time relating to the drying of the ink on the paper, so that the ink may have reached a relatively fixed color so as to be able to perform a relatively accurate prediction of the re-emitted wavelengths of the hard copy corresponding to certain illumination conditions.

The printer 17 may further be provided with an operator panel 20. The control panel 20 may be arranged to allow for an operator to indicate an illumination condition of a print, or retrieve illumination condition tables, and/or control print settings.

Figure 4:
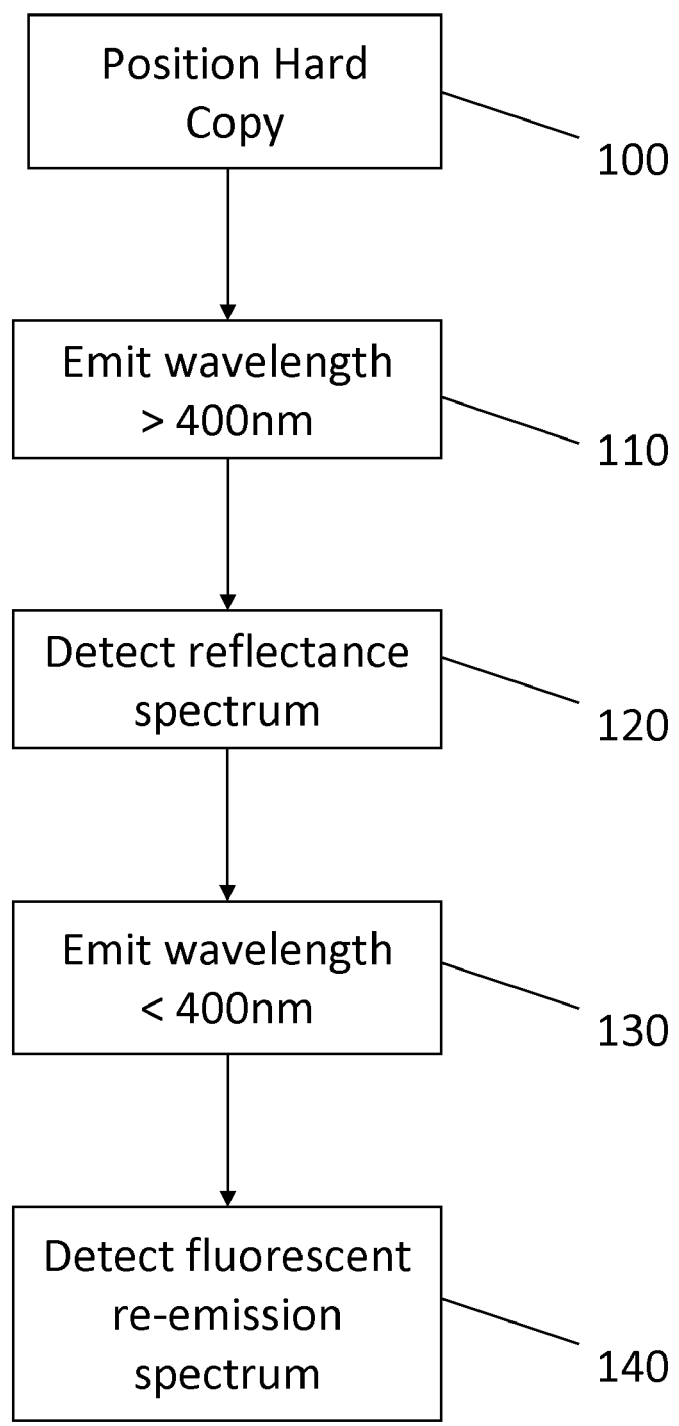
FIG. 4 shows a flow chart of a color measurement method.

FIG. 4 shows a method of measuring the color of a hard copy under certain illumination conditions. In step 100, a hard copy 3 may be positioned in or onto a printer 17. The hard copy 3 may be fed along the print heads 19 and may be printed. After printing the ink may dry and/or fix on the hard copy 3. The hard copy 3 may be put into position with respect to the light arrangement 2, for example by the feed arrangement 18.

The first light may be emitted onto the hard copy in step 110. The first light may be re-emitted by the hard copy 3 and the re-emitted light may be detected by the light detector 4. In an embodiment, the first light may comprise wavelengths longer than the ultraviolet range so that no, or a relatively small amount of, fluorescence affects the re-emitted wavelength, and all or a substantial part of the light is reflected. At least one wavelength of the reflected light may be detected by the light detector 4 in step 120.

In step 130, the second light may be emitted onto the hard copy 3, at least partially onto the same region as the first light. The second light may comprise ultraviolet light so that the hard copy 3 may re-emit at least a part of the second light at a longer wavelength due to fluorescent particles that are present in the hard copy 3. The wavelengths that are re-emitted by the hard copy 3 may be measured by the light detector 4 in step 140.

The first and second light may simultaneously emit onto the hard copy 3, and the re-emitted wavelengths may be detected so as to measure re-emission at a relatively broad emission spectrum. The first and second light may be switched, so as to be able to emit separately as well as simultaneously onto the hard copy.

The full reflectance spectrum of the re-emitted wavelengths of a printed hard copy 3 may be measured by the light detector 4. Also, a single wavelength re-emission, for example of a single color dot or relatively small single color region on the hard copy 3, may be measured.

During emission, the first light may be transmitted through a reflective filter 14. The second light may be reflected by the reflective filter 14. The light paths of both lights may be guided, separately and/or simultaneously, through the light guide 9, onto an overlapping region 10 of the hard copy 3 and re-emitted to the light detector 4, wherein at least a part of the second light may be re-emitted at a longer wavelength than its original emission wavelength.

Figure 5:
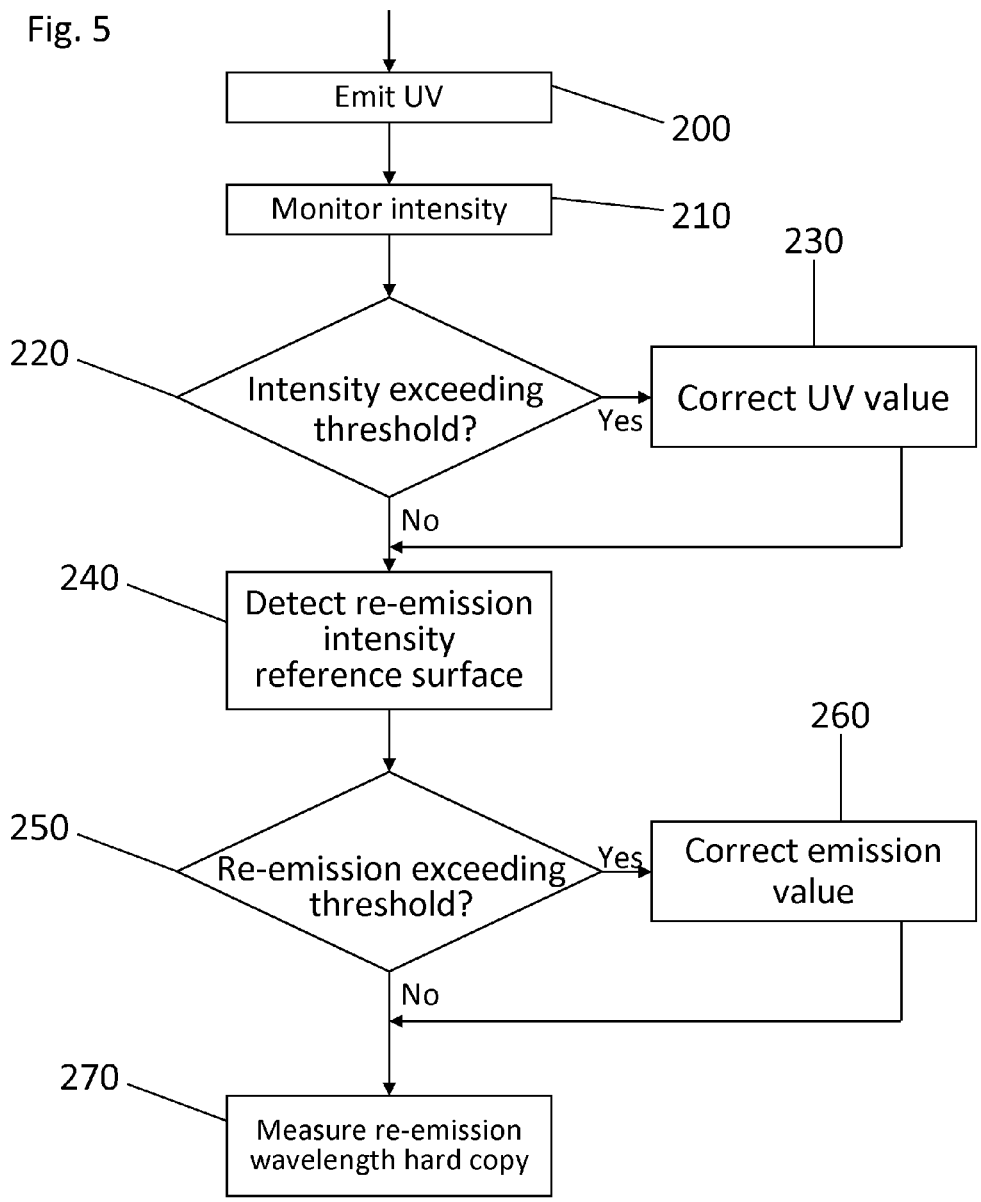
FIG. 5 shows a flow chart of a method of calibration.

FIG. 5 shows a method of calibrating the color measurement system 1. The method of calibrating the color measurement system 1 may be executed while, before and/or after color measuring, such as described with reference to FIG. 4, so that correct emission values may be used by the system 1.

In step 200, light comprising ultraviolet wavelengths is emitted. The ultraviolet light may be monitored by the light monitor 6 in step 210. The intensity of the emitted ultraviolet light may be monitored. The second light source 8 may be monitored. The monitored light intensity, or changes in intensity, may be converted into signals relating to the intensity and/or intensity fluctuations.

In step 220, it may be verified if said signals exceed a certain predetermined threshold value, i.e. if said signals cross a certain pre-indicated value. It may be verified if the ultraviolet wavelength intensity, and/or fluctuations thereof, exceed a certain threshold value. If the ultraviolet light intensity signals exceed a threshold value this may have an effect on the re-emission by fluorescent particles that may be present in the hard copy 3 as the level of re-emission by the fluorescent particles may depend on the intensity of the emitted ultraviolet wavelengths. The threshold value may be a threshold range and/or an upper and/or lower limit value. If the ultraviolet light intensity exceeds the threshold value this may be an indication that the color measurement system 1 may need to be calibrated, as indicated in step 230. An ultraviolet wavelength intensity value may be calibrated. In one embodiment, the ultraviolet light emission may be calibrated. For example, the power and/or temperature of the second light 8 may be calibrated, for example so that it emission does not exceed the threshold value. In another embodiment, the control circuit 5 may internally correct the value corresponding to the ultraviolet emission so as to approximately correspond to the actual emission. Also a new threshold value may be set.

Furthermore, the ultraviolet light may be emitted onto the reference surface 16 that may comprise fluorescent particles. The reference surface 16 may re-emit the incident light onto a light detector 4. The light detector 4 may detect the light that is re-emitted by the reference surface 16 in step 240.

The light detector 4 may detect changes in re-emission by the reference surface 16 and/or the hard copy 3 which may be a result of changes in light emission. A shift in wavelength of the emitted ultraviolet light may result in a change in fluorescent re-emission by the reference surface 16. Such re-emission changes may be detected by the light detector 4, and converted into a corresponding reference signal. For example, a re-emission change may be detected by the light detector 4, when substantially no change is detected in the ultraviolet emission intensity by the monitor 6. This may indicate an ultraviolet emission wavelength shift, since the absorption profile of the fluorescent material may vary with wavelength. In step 250, it is verified whether the reference signal exceeds a certain predetermined reference threshold value.

In step 260, the color measurement system 1 may perform a calibration when the reference signals exceed at least one preset reference threshold value. The emission wavelength value of the second light 8 may be calibrated correspondingly. In an embodiment, the emission wavelength value may be calibrated by correcting an ultraviolet emission value that is stored in the system 1. In another embodiment, the second light may be calibrated, for example by adjusting at least one of power, current, and/or temperature.

To measure a wavelength shift, multiple detections may be executed. A reflective re-emission by a reference section 16B having little or no fluorescence may be detected. A fluorescent and/or reflective re-emission by a reference section 16A having fluorescence may be detected. Both detected wavelengths and/or intensities may be compared to each other and/or to stored values in a predetermined table. The predetermined table may store calibration values corresponding to fluorescent and/or non-fluorescent emission values. Both the first and the second light emission values may be calibrated in the system 1 due to detected wavelength and/or intensity shifts, for example by calibrating the respective light source 7, 8 and/or by correcting a stored value. In step 270, the re-emission wavelengths of the hardcopy 3 may be detected using correctly calibrated values that correspond to the actual emission intensity and/or wavelength.

Figure 6:
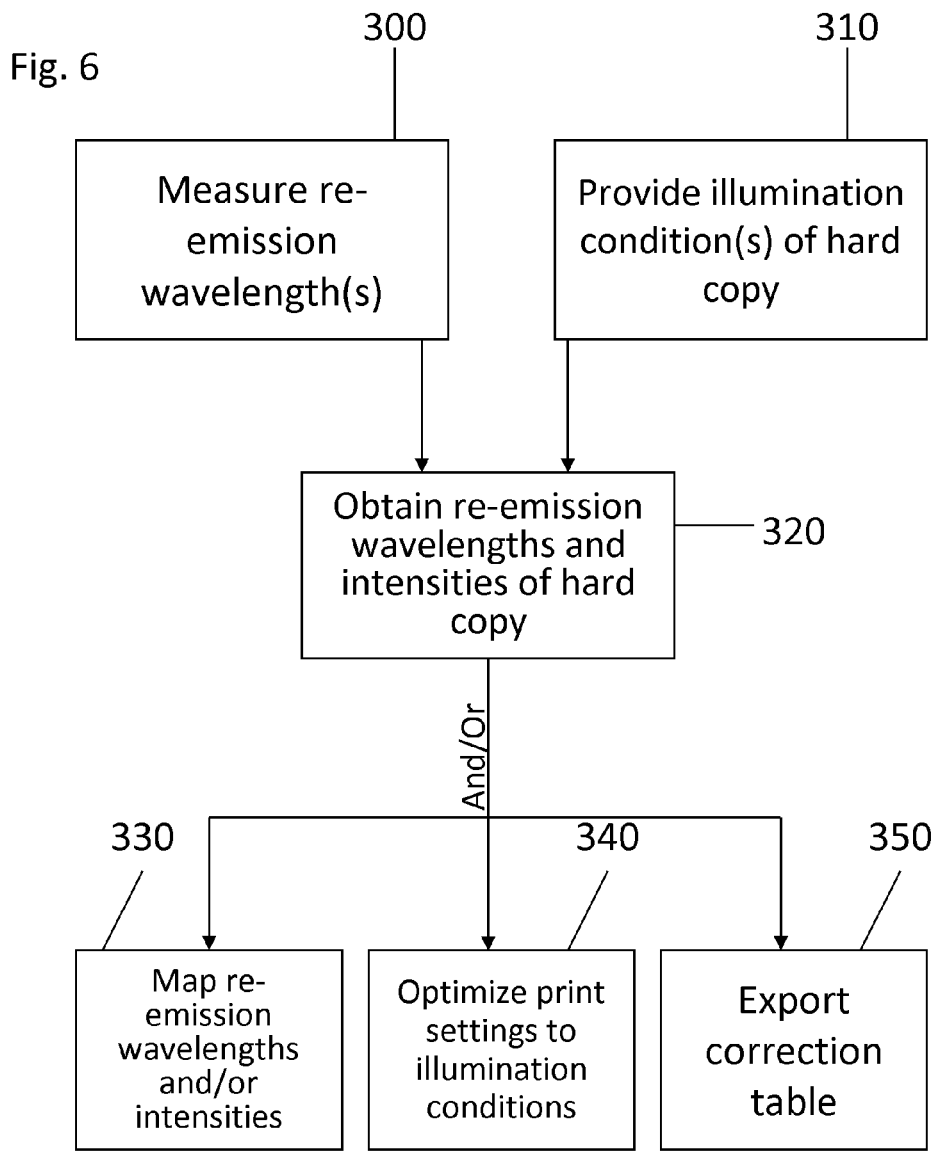
FIG. 6 shows a flow chart of a method of processing illumination conditions.

FIG. 6 shows a method of determining re-emission wavelengths of the hard copy 3. In step 300 re-emission wavelengths corresponding to the first and/or second light emissions are determined, for example according to one or more steps of the methods as described with reference to FIG. 4 and/or 5. In step 310, a particular illumination condition of the hard copy 3 is determined. For example, a user may indicate an illumination condition, and/or the color measurement system 1 may have stored one or more illumination conditions.

After having measured the re-emission spectrum, for example as described with reference to FIGS. 4 and 5 and step 300, multiple re-emission spectra for different illumination conditions may be determined, for example by referring to the predetermined table. The color measurement system 1 may have stored a predetermined table wherein illumination conditions and corresponding re-emission spectra of certain hard copy fluorescence and reflectivity properties are mapped. Having measured the emission values of the light sources 7, 8 and re-emission values, other re-emission values, corresponding to other illumination conditions may be associated to the measured values and may be derived from the table. The predetermined table may have been determined empirically. Instead of, or in addition to such table, re-emission wavelengths for different illumination conditions may be determined by one or more algorithms.

In step 320, the re-emission wavelengths of the hard copy 3 corresponding to an indicated illumination condition may be obtained, for example by way of a table and/or an algorithm or in any other way. Equally, color intensity properties of the hard copy 3 may be obtained.

One or a combination of steps 330, 340, 350 may be carried out by the color measurement system 1. In step 330, a table or map with certain illumination conditions and corresponding re-emission wavelengths may be generated in relation to a specific printed hard copy 3, and may be stored. In step 340, the system 1 may internally optimize its print settings according to the indicated illumination conditions. In step 350, the system 1 may export a correction table so as to indicate optional print color corrections optimized for different illumination conditions. It should be understood that the processing steps of the color measurement system 1 should not be limited to these steps 330, 340, 350. Other ways of processing and optionally outputting the gathered results from the performed color measurements may be applied by the color measurement system 1.

According to a first aspect there may be provided a hard copy re-emission color measurement system 1, comprising a light arrangement 2 for emitting light onto a hard copy 3, a light detector 4 arranged to detect light re-emitted by the hard copy 3, and/or a control circuit 5 configured to process the detected re-emitted light. The light arrangement 2 may be arranged to separately and simultaneously emit a first light having wavelengths longer than an ultraviolet wavelength and a second light having wavelengths in the ultraviolet range, i.e. the light arrangement may be arranged to switch between the first and the second light, and a condition wherein both lights are emitted together. The light arrangement 2 may be provided with a light guide 9 arranged to guide the first and second light on an at least partly overlapping region 10 on the hard copy 3.

According to a second aspect there may be provided a hard copy printer 17 comprising a hard copy re-emission color measurement system 1, print heads 19, and/or a hard copy feed arrangement 18 arranged to guide a hard copy 3 along the print heads 19 and the hard copy re-emission color measurement system 1. The hard copy re-emission color measurement system 1 may comprise a first light source 7 for emitting light that includes light having wavelengths longer than the ultraviolet range, an ultraviolet light source 8, and a light detector 4 arranged to detect light that is re-emitted by the hard copy 3 for measuring hard copy re-emission wavelengths.

According to a third aspect there may be provided a method of measuring a re-emission wavelength signal of a hard copy 3. In this method, a hard copy 3 may be positioned in or on a printer 17. A first light of first wavelengths that are longer than an ultraviolet wavelength may be emitted onto the hard copy 3, the first light may be reflected by the hard copy 3, and at least one wavelength that may be reflected by the hard copy 3 may be measured. A second light comprising second wavelengths in the ultraviolet range may be emitted onto the hard copy 3, onto the same region 10 as the first light, the second light may be re-emitted by the hard copy 3, at least a part of the light may be re-emitted at a longer wavelength than the emitted light as a result of fluorescence of the hard copy 3, and at least one wavelength that is re-emitted by the hard copy 3 may be measured.

The hard copy re-emission color measurement system 1 may be built up out of relatively small and cost efficient components. Hence the color measurement system 1 may be readily embedded in a printer 17. Amongst others, the applications of LEDs, and the light guide 9 may allow for the system 1 to be of a relatively small size. Moreover, the combination of the reference surface 16 and the monitor 6 may allow for accurate calibration, over a relatively wide color spectrum. Relatively broad band emission and/or detection sources may be applied to measure fluorescence properties, as long as relatively accurate calibration occurs. If the light sources are stable or periodically calibrated, relatively accurate measurement of fluorescent re-emission may be measured.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Multiple alternatives, equivalents, variations and combinations may be made without departing from the scope of the invention.

The invention claimed is:

1. Hard copy re-emission color measurement system, comprising
   a light arrangement for emitting light, including a first light and a second light, onto a hard copy,
   a light detector arranged to detect light re-emitted by the hard copy,
   a light guide to receive the light emitted by the light arrangement and to output the first light and the second light on an at least partially overlapping region of the hard copy,
   an ultraviolet light monitor positioned opposite a portion of the light configured to emit the second light to detect the second light without the second light having been re-emitted by the hard copy, and
   a control circuit configured to process the detected re-emitted light, wherein
      the light arrangement is arranged to separately and simultaneously emit the first light having just wavelengths longer than an ultraviolet wavelength and the second light having wavelengths in the ultraviolet range, such that when the first light and the second light are separately emitted, at a first time the first light is on and the second light is off and at a second time the first light is off and the second light is on.

2. Hard copy re-emission color measurement system according to claim 1, provided with a first light source configured to emit light having wavelengths longer than the ultraviolet range, and a second light source configured to emit light in the ultraviolet range.

3. Hard copy re-emission color measurement system according to claim 2, wherein the light arrangement comprises a reflective filter provided in the light path of the first and second light source, the reflective filter being arranged to reflect ultraviolet light and transmit light of a wavelength longer than an ultraviolet wavelength so that the resulting path of the first light and the resulting path of second light at least partly overlap.

4. Hard copy re-emission color measurement system according to claim 1, wherein the ultraviolet light monitor is to detect the intensity of the emitted second light, and
the control circuit is configured to
process the light monitor signals corresponding to the intensity of the detected second light,
compare the signal to a threshold value, and
perform a calibration internally if the signals exceed the threshold value.

5. Hard copy re-emission color measurement system according to claim 1, wherein a reference surface is provided, comprising fluorescent material.

6. Hard copy re-emission color measurement system according to claim 5, wherein a reference surface is provided, comprising at least two sections, of which at least one section comprises fluorescent material, and at least one other section is arranged to inhibit re-emission by fluorescence.

7. Hard copy re-emission color measurement system according to claim 5, wherein the light detector is arranged to detect light that is re-emitted by the reference surface, and compare the detected signals to a reference value.

8. Hard copy re-emission color measurement system according to claim 1, wherein the light detector comprises a spectrometer.

9. Hard copy printer provided with a re-emission color measurement system according to claim 1, comprising at least one hard copy print head for printing images onto a hard copy.

10. Hard copy printer comprising
a hard copy re-emission color measurement system,
print heads, and
a hard copy feed arrangement arranged to guide a hard copy along the print heads and the hard copy re-emission color measurement system, wherein
the hard copy re-emission color measurement system comprises
a first light source for emitting light that includes light having wavelengths longer than the ultraviolet range,
an ultraviolet light source,
a light detector arranged to detect light that is emitted by said light sources and re-emitted by the hard copy for measuring hard copy re-emission wavelengths, and
an ultraviolet light monitor, different than the light detector, and positioned opposite the ultraviolet light source to detect the light emitted by the ultraviolet light source without the light emitted by the ultraviolet light source having been re-emitted by the hard copy.

11. Method of measuring a re-emission wavelength signal of a hard copy, wherein
a hard copy is positioned in or on a printer,
a first light of wavelengths that are longer than an ultraviolet wavelength is emitted onto the hard copy, the first light is reflected by the hard copy, and at least one wavelength that is reflected by the hard copy is measured,
a second light comprising wavelengths in the ultraviolet range is emitted onto the hard copy, onto the same region as the first light, the second light is re-emitted by the hard copy, at least a part of the light is re-emitted at a longer wavelength than the emitted light as a result of fluorescence of the hard copy, and at least one longer wavelength is measured, and
the wavelengths in the ultraviolet range are further detected without the wavelengths in the ultraviolet range having been re-emitted by the hard copy.

12. Method according to claim 11, wherein
the wavelengths longer than an ultraviolet wavelength are at least partly transmitted and the wavelengths in the ultraviolet range are at least partly reflected by a reflective filter, and
the path of the transmitted light and the path of the reflected light at least partly overlap on a region of the hard copy.

13. Method according to claim 11, wherein
a light intensity fluctuation of the ultraviolet emission exceeds a preset threshold value, and
the ultraviolet light emission value is calibrated.

14. Method according to claim 11, wherein
the second light is emitted onto a reference surface section having predetermined fluorescent behavior,
the reference surface section re-emits at least a part of the second light at a longer wavelength due to fluorescence,
the re-emitted wavelength range is detected,
the detected signals are compared to a reference value,
the detected signals exceed the reference value, and
the second light intensity is calibrated.

15. Method according to claim 11, wherein the light intensity fluctuations of the second light emission do not exceed a preset threshold value relating to calibration.

16. Method according to claim 11, wherein
an image is printed onto a the hard copy,
at least one illumination condition for the printed hard copy is estimated, and
at least one re-emission spectrum of the printed hard copy corresponding to the estimated illumination condition is determined.

17. Method according to claim 16, wherein multiple re-emission spectra of a printed hard copy based on multiple respective estimated illumination conditions are mapped in a table.

* * * * *

UNITED STATES PATENT AND TRADEMARK OFFICE
CERTIFICATE OF CORRECTION

| | |
|---|---|
| PATENT NO. | : 8,125,625 B2 |
| APPLICATION NO. | : 12/501449 |
| DATED | : February 28, 2012 |
| INVENTOR(S) | : Stephan Clark et al. |

Page 1 of 1

It is certified that error appears in the above-identified patent and that said Letters Patent is hereby corrected as shown below:

In column 10, line 47, in Claim 1, delete "light" and insert -- light arrangement --, therefor. (1st occurrence)

In column 12, line 42, in Claim 16, delete "a the" and insert -- the --, therefor.

Signed and Sealed this
Sixth Day of November, 2012

David J. Kappos
*Director of the United States Patent and Trademark Office*